(12) United States Patent
Chow et al.

(10) Patent No.: US 7,910,077 B2
(45) Date of Patent: Mar. 22, 2011

(54) CONFIGURATIONS AND METHODS FOR $SO_x$ REMOVAL IN OXYGEN-CONTAINING GASES

(75) Inventors: Thomas King Chow, Irvine, CA (US); Vincent Wai Wong, Hacienda Heights, CA (US); John Gebur, El Monte, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 609 days.

(21) Appl. No.: 11/718,684

(22) PCT Filed: Oct. 20, 2005

(86) PCT No.: PCT/US2005/038023
§ 371 (c)(1),
(2), (4) Date: Nov. 14, 2007

(87) PCT Pub. No.: WO2006/052424
PCT Pub. Date: May 18, 2006

(65) Prior Publication Data
US 2009/0004080 A1   Jan. 1, 2009

(51) Int. Cl.
*B01D 53/46* (2006.01)
*B01J 19/00* (2006.01)
*C01B 17/02* (2006.01)

(52) U.S. Cl. ............... 423/219; 423/242.1; 423/244.01; 423/244.09; 423/244.1; 422/168; 422/169; 422/170; 422/171; 422/177; 422/180

(58) Field of Classification Search .......... 422/168–171, 422/177, 180, 187; 423/219, 242.1, 244.01, 423/244.09, 244.1
See application file for complete search history.

(56) References Cited

U.S. PATENT DOCUMENTS

| | | | |
|---|---|---|---|
| 3,554,689 A * | 1/1971 | Bloembergen et al. | 423/219 |
| 3,719,742 A | 3/1973 | Terrana et al. | |
| 3,790,660 A | 2/1974 | Earl et al. | |
| 3,904,735 A | 9/1975 | Atwood et al. | |
| 3,920,794 A | 11/1975 | La Mantia et al. | |
| 4,505,880 A * | 3/1985 | Deschamps et al. | 423/219 |
| 6,214,311 B1 | 4/2001 | Kwong | |
| 7,749,455 B2 * | 7/2010 | Harada et al. | 422/110 |

FOREIGN PATENT DOCUMENTS

| WO | 01/531197 | 7/2001 |
|---|---|---|
| WO | 03/045544 | 6/2003 |

* cited by examiner

*Primary Examiner* — Timothy C Vanoy
(74) *Attorney, Agent, or Firm* — Fish & Associates, PC

(57) ABSTRACT

Sulfur oxides are removed from an oxygen-containing acid gas in configurations and methods in which oxygen is removed from the acid gas using reducing gases at relatively high temperature. The so treated acid gas is then fed to a direct reduction reactor in which the sulfur species are converted to elemental sulfur. Contemplated configurations are particularly effective and economically attractive as they are generally not limited by reaction equilibrium as present in a Claus reaction and do not require solvent and solvent-associated equipment.

19 Claims, 1 Drawing Sheet

CONFIGURATIONS AND METHODS FOR SO$_x$ REMOVAL IN OXYGEN-CONTAINING GASES

This application is a national stage filing of PCT/US05/38023, which was filed Oct. 20, 2005, and further claims the benefit of our copending International patent application with the serial number PCT/US04/37556, which was filed Nov. 9, 2004, and further refers to our copending International patent application with the serial number PCT/US04/12599, which was filed Apr. 22, 2004, both of which are incorporated by reference herein.

FIELD OF THE INVENTION

The field of the invention is treatment of effluent gases, and especially removal of sulfur dioxide and sulfur trioxide from oxygen-containing gases.

BACKGROUND OF THE INVENTION

Currently known processes for sulfur dioxide from oxygen-containing gases typically employ caustic processes (see e.g., U.S. Pat. No. 3,719,742 to Terrana et al.; U.S. Pat. No. 3,790,660 to Earl et al.; or U.S. Pat. No. 3,920,794 to La Mantia et al.), or processes that use amine-type solvents to absorb SO$_2$ from a waste gas (see e.g., U.S. Pat. No. 3,904,735 to Atwood et al.) However, several difficulties remain in such processes. Among other things, most caustic processes consume relatively large amounts of energy for stripping and solvent circulation, while many alkanolamines have a relatively low selectivity towards SO$_2$ and tend to absorb significant quantities of CO$_2$.

Alternatively, as described in our International patent application with the serial number PCT/US02/25998 (published as WO 03/045544), sulfur dioxide-containing waste gas is introduced into a reducing gas generator that is operated using natural gas, air, and hydrogen to supply sufficient reducing gas to the effluent gas. Typical operation conditions are selected such that the oxygen is substantially completely removed from the waste gas. The so formed hydrotreated feed gas comprises hydrogen sulfide, which is then removed using a contactor and appropriate solvent. Such configurations advantageously improve sulfur removal under most conditions. However, high temperature operation and supplemental fuel gas are often needed, which tends to increase cost and complexity of the operation. Moreover, such processes often consume significant amounts of energy for solvent circulation and regeneration.

To eliminate problems associated high-temperature operation, configurations may be employed in which sulfur species are removed at moderate temperature (e.g., 600-900° F.) using separate catalytic reactions that take further advantage of the Claus reaction. Exemplary configurations are disclosed in our copending International application with the serial number PCT/US04/12599. Still further alternative configurations that employ catalytic removal of oxygen from the sulfur oxide containing feed gas are described in our copending International application with the serial number PCT/US04/37556. While such configurations are especially advantageous for plants where solvent operation is preferred, various drawbacks may remain. Among other things, such configurations rely at least in part on a Claus-type reaction, which is limited by the relatively unfavorable reaction equilibrium towards sulfur formation. Similarly, as described in U.S. Pat. No. 6,214,311, a Claus process is coupled with direct oxidation of hydrogen sulfide from the upstream Claus reaction to elemental sulfur using a suitable catalyst and excess air. Once more, such configurations often achieve a relatively clean effluent, however, are generally limited by the reaction equilibrium of the Claus reaction.

Thus, although numerous configurations and methods are known in the art to reduce sulfur concentrations in oxygen-containing effluent streams, all or almost all of them suffer from one or more disadvantages. Therefore, there is still a need to provide improved methods and configuration to reduce the sulfur content in such streams.

SUMMARY OF THE INVENTION

The present invention is directed to configurations and methods of sulfur removal from oxygen-containing acid gases, wherein oxygen is removed from the acid gas using a reducing gas generator, and wherein the so treated oxygen depleted acid gas is fed to a direct reduction reactor in which the sulfur species are reduced to elemental sulfur. Plants using such configurations are especially economic as substantially all (at least 85%, more typically at least 95%, most typically 99%) of the sulfur species are converted to elemental sulfur in a process other than a Claus reaction, which is ordinarily limited by the reaction equilibrium.

In one aspect of the inventive subject matter, a plant includes a source configured to provide an oxygen-containing acid gas comprising a plurality of sulfur species. A reducing gas generator is coupled to the source and configured to receive the oxygen-containing acid gas, and further configured to (1) operate under conditions effective to remove oxygen in the oxygen-containing acid gas and (2) to produce an oxygen depleted gas that is enriched in hydrogen and carbon monoxide. Contemplated plants further include a catalytic reactor that is coupled to the reducing gas generator and configured to receive the oxygen depleted gas, wherein a direct reduction catalyst is disposed in the catalytic reactor, and wherein the catalytic reactor is configured to convert at least one of the plurality of sulfur species to elemental sulfur and an offgas depleted in the sulfur species.

Most typically, the oxygen-containing acid gas is or comprises a gas from a catalyst regenerator effluent, a fluid catalytic cracking flue gas, a coker flue gas, and/or a smelter flash gas and will have an oxygen concentration between 2 vol % to 15 vol %. Therefore, such gases generally include sulfur dioxide, sulfur trioxide, carbonyl sulfide, and/or carbon disulfide in a total amount of less than 50 vol %. With respect to pressures, it is generally preferred that the oxygen-containing acid gas is at a pressure of no more than 50 psia.

Preferred catalysts are all catalysts that assist in direct reduction of the sulfur species to elemental sulfur, and most preferably without catalyzing a Claus reaction. Therefore, and among other suitable catalysts, especially preferred direct reduction catalysts include iron/gamma alumina, and CoMo catalysts, and those described in U.S. Pat. Nos. 6,214,311 and 5,384,301. Therefore, the direct reduction is preferably performed at a temperature of between about 400-1000° F. Where desirable, additional hydrogen may be provided to the reducing gas generator, which is preferably operated at a temperature of between 1100-1300° F.

Viewed from another perspective, a plant may include a direct reduction reactor that is configured such that sulfur oxides and hydrogen sulfide from an oxygen depleted gas are converted to elemental sulfur in the reactor. Contemplated plants will also include a reducing gas generator that is coupled upstream to the reduction reactor and configured to operate under conditions sufficient to deplete oxygen from a feed gas (e.g., fluid catalytic cracking flue gas, catalyst regenerator effluent, coker flue gas, or smelter flash gas) comprising the sulfur oxides and the hydrogen sulfide to thereby generate the oxygen depleted gas.

In such plants, the sulfur oxides and the hydrogen sulfide are preferably present in the oxygen depleted gas at a concentration of no more than 15 vol %, and the reducing gas generator is typically configured to operate at a temperature of between 1000-1500° F., while the direct reduction reactor is configured to operate at a temperature of between 400-1000° F. Such plants will typically (but not necessarily) include an effluent cooler that is disposed between the reducing gas generator and the direct reduction reactor.

Consequently, the inventors contemplate a method of treating an acid gas in which in one step an oxygen-containing acid gas is provided that includes a plurality of sulfur species. At least a portion of the oxygen-containing acid gas is then fed to a reducing gas generator and the reducing gas generator is operated under conditions effective to remove oxygen in the oxygen-containing acid gas to thereby form an oxygen depleted gas that is enriched in hydrogen and carbon monoxide. In yet another step, the hydrogen and/or carbon monoxide are reacted in the presence of a direct reduction catalyst with at least one of the sulfur species to thereby form elemental sulfur and an offgas depleted in the sulfur species.

Typically, the reducing gas generator is operated at a temperature of between 1100-1400° F., while the reducing gas generator is operated at a temperature of between 400-1000° F. Where desirable, and depending on the composition of the oxygen depleted gas, additional hydrogen may be provided. The so produced offgas may then be incinerated, or vented to the atmosphere.

Various objects, features, aspects and advantages of the present invention will become more apparent from the accompanying drawing and the following detailed description of preferred embodiments of the invention.

DETAILED DESCRIPTION

Figure 1:
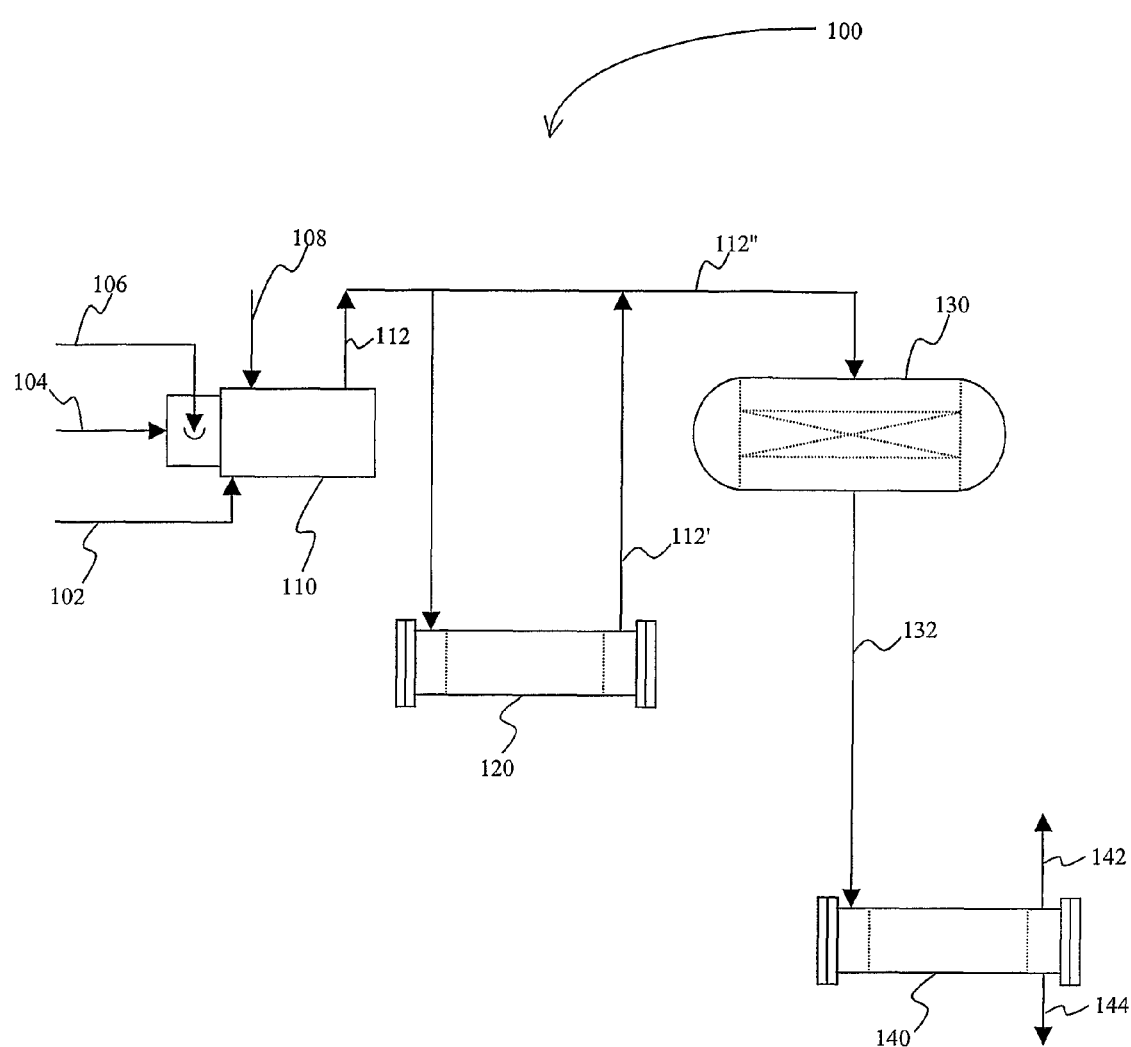
FIG. 1 is an exemplary configuration of contemplated plants.

The inventors have discovered that various sulfur species, and particularly SOx (sulfur dioxide and sulfur trioxide) can be effectively removed from oxygen-containing acid gases in a plant configuration in which oxygen ($O_2$) is eliminated by combustion of the acid gas in a reducing gas generator. It should be noted that such process not only eliminates oxygen from the acid gas, but also provides the reducing gases ($H_2$ and CO) for the subsequent direct reduction of the sulfur species to elemental sulfur. Direct reduction is then performed using the (typically cooled) effluent from the reducing gas generator in a downstream reactor using a direct reduction catalyst.

In one exemplary configuration as schematically illustrated in FIG. 1, a plant 100 comprises a reducing gas generator 110 that receives an oxygen-containing acid gas 102 from a catalyst regenerator (e.g., effluent from Z-Sorb process; not shown). Typically, the acid gas 102 will be at a pressure of less than 50 psia (most typically between 20 psia and 40 psia) and contain between about 2 vol % to about 15 vol % oxygen. As used herein, the term "about" in conjunction with a numeral refers to a range of +/−10% of that numeral, inclusive. Among other sulfur species, the acid gas is further contemplated to comprise a total of about 2.2 vol % of $SO_2$ and $SO_3$, and less than 0.5 vol % total of $H_2S$ and COS.

The reducing gas generator 110 uses natural gas 104 and air (and/or optionally $O_2$) 106 to maintain a flame temperature of about 1200° F. to consume substantially all oxygen. Thus, reducing gas generator effluent 112 is an oxygen depleted gas that is enriched in hydrogen and carbon monoxide. Preferably, oxygen is removed from the acid gas stream 112 to a degree sufficient to maintain proper catalyst function. Therefore, oxygen will be present in stream 112 at a concentration of less than 0.5 vol %, more typically less than 0.1 vol %, and most typically less than 0.01 vol %. Where desired, additional reducing agent (e.g., $H_2$ and/or CO) 108 may be fed to the reducing gas generator.

The reducing gas generator effluent 112 is typically at a temperature of about 1200° F. and at least a portion of the effluent 112 is cooled in reactor feed cooler 120 forming cooled stream 112', which is then (combined with effluent 112) to form cooled oxygen depleted gas 112'' at a temperature of between about 400-600° F. Most preferably, cooled oxygen depleted gas 112'' is directly fed to the direct reduction reactor 130 in which a direct reduction catalyst assists reduction of the sulfur species to elemental sulfur. It is expected that over 90% of conversion efficiency can be achieved using such configuration. The reactor effluent 132 is then fed to the sulfur condenser 140 from which elemental sulfur is withdrawn as stream 144 (which may or may not subsequently be degassed), and which releases desulfurized effluent 142 to the stack or an incinerator.

In alternative aspects of the inventive subject matter, it should be appreciated that numerous sources other than a catalyst regenerator effluent stream are also deemed suitable, and that all oxygen-containing gaseous streams that include at least one sulfur species are also considered appropriate for use herein. Most typically the oxygen content in contemplated oxygen-containing acid gases will be between about 20 vol % and 0.1 vol %, and even less. For example, where the oxygen-containing acid gas is a regenerator effluent, relatively high levels (e.g., between about 5 vol % and about 20 vol %) of oxygen may be present. On the other hand, and especially where the oxygen-containing acid gas is a fluid catalytic cracking flue gas, a coker flue gas, Claus tail gas, smelter flash gas, or combustion gas, the oxygen content may be relatively moderate to low (e.g., between about 2 vol % and about 15 vol % to between about 0.5 vol % and about 5 vol %).

Similarly, and depending on the particular nature of the oxygen-containing acid gas, the sulfur species and concentration will vary greatly. Among other contemplated compounds, particularly contemplated sulfur species include $SO_2$ and $SO_3$. However, further contemplated sulfur species include alkyl mercaptans, $CS_2$, COS, and $H_2S$. With respect to concentration of the sulfur species, it is generally contemplated that the sulfur species may be present in a total amount of between 0.1 vol % and about 50 vol % (most typically equal or less than 50 vol %). However, and more typically, the sulfur species will be present in a range from about 0.1 vol % to about 2.0 vol %, and even more typically in a range from about 0.5 vol % to about 5.0 vol % (and in some cases in a range from about 2.0 vol % to about 25 vol %). Furthermore, and while not limiting to the inventive subject matter, it is generally contemplated that the sulfur oxides in contemplated oxygen containing acid gases are the predominant fraction in the acid gases (i.e., $SO_2$ and/or $SO_3$ are present in an amount of at least 50 mol % of the total sulfur species).

Particularly suitable fuels for the reducing gas generator are natural gas, methane, or syngas, but it should be appreciated that all other fuels known for use in reducing gas generators are also deemed suitable. Depending on the nature of the fuel and the oxygen containing acid gas, it is contemplated that the combustion may be supported by air, oxygen, and/or mixture of purified gases to achieve a flame temperature and reaction conditions suitable to (a) produce reducing gas, preferably in an amount sufficient to reduce the sulfur species in the downstream reactor, and (b) to eliminate substantially all oxygen from the acid gas. Where needed, it should be appreciated that $H_2$ (and/or CO) may be added to the reducing gas generator or effluent. Likewise, and where available, oxygen-free streams that include one or more sulfur species (e.g., recycling streams from within a plant) may be added. In less preferred aspects, it is also contemplated that oxygen may be removed from the acid gas by combustion, and that the reducing gas or reducing gases are added separately to the oxygen depleted gas. Regardless of the manner of removing oxygen from the oxygen containing acid gas, it is contemplated that the oxygen depleted gas is enriched in hydrogen and carbon monoxide, and has an oxygen content of less than 1 vol %, more typically less than 0.5 vol %, even more typically less than 0.1 vol %, and most typically less than 0.01 vol %. To that end, the reducing gas generator will therefore be operated at a temperature of between about 1000 to about 1600° F., and most typically at a temperature of between about 1100 to about 1300° F.

Under most circumstances, the so generated reducing gas generator effluent will typically have a temperature that well exceeds the operating temperature of a downstream direct reduction reactor. Consequently, it is preferred that the effluent is cooled in a separate reactor feed cooler as depicted in FIG. 1 to a temperature suitable for feeding to the direct reduction reactor (e.g., preferably between 400-600° F.), and/or by cooling the effluent at the reducing gas generator outlet (e.g., to produce steam). Depending on the particular configuration, it should be recognized that all or only a part of the effluent is cooled. Where only a portion of the effluent is cooled, it is generally preferred that the cooled portion is then combined with the uncooled effluent portion to achieve a temperature of about 300 to 750° F., and most preferably of about 400 to 600° F.

The direct reduction reactor is typically configured to directly receive the cooled effluent and may further be configured to receive an additional feed of reductant (e.g., $H_2$ and/or CO). However, in alternative aspects, additional sulfur species containing feed streams may also be fed to the reactor (directly, or as a mixture with the effluent). Furthermore, suitable feed streams may be wet streams or dry streams. Regardless of the nature of the feed stream to the direct reduction reactor, it is generally contemplated that the reactor includes one or more direct reduction catalysts that will catalyze the direct reduction of the sulfur species (and most preferably of sulfur oxides) to elemental sulfur. Furthermore, it is generally preferred that the direct reduction catalyst will not, or only to a small degree (e.g., less than 10%, more typically less than 5% with respect to the sulfur species) catalyze a Claus reaction. There are numerous catalysts for direct reduction of sulfur oxides and other sulfur compounds known in the art, and all of them are deemed suitable for use herein. However, especially preferred catalysts include iron/gamma alumina, and CoMo catalysts, and those described in U.S. Pat. Nos. 6,214,311 and 5,384,301, both of which are incorporated by reference herein.

Thus, and among various alternative operating conditions, the direct reduction reactor is preferably operated at a temperature of between about 400 to 1000° F., and at a pressure of equal or less than 50 psia. However, where desired, the reduction reactor may be operated at various other temperatures, and the exact operating temperature will depend at least in part on the particular catalyst used, the concentration of sulfur species, and the residual sulfur species concentration in the reactor effluent. For example, suitable temperatures may be between about 600 and 700° F., less typically between about 700 and 900° F., and even less typically up to 1200° F. However, the lower temperature will typically be limited by the melting point of the elemental sulfur. Similarly, the pressure of the cooled reactor feed gas may vary considerably. While under most circumstances the pressure will be between about 10-50 psia, higher pressures are also contemplated. Among other advantages, higher pressures may provide a kinetic advantage to the direct reduction. Therefore, pressure increasing devices (blowers, compressors, etc) may be included upstream of the reduction reactor to increase pressure in the reactor feed. With respect to the direct reduction reactor configurations, it should be appreciated that the reactor may have all configurations known in the art, and will most typically be configured as a packed bed or fluidized bed reactor.

Therefore, it should be recognized that the inventors contemplate a plant configuration in which a source provides an oxygen-containing acid gas comprising a plurality of sulfur species. A reducing gas generator is configured to receive the oxygen-containing acid gas and is farther configured to operate under conditions effective to remove oxygen in the oxygen-containing acid gas to thereby produce an oxygen depleted gas that is enriched in hydrogen and carbon monoxide. Contemplated plant configurations will also include a catalytic reactor that is coupled to the reducing gas generator and that is configured to receive the oxygen depleted gas. A direct reduction catalyst is disposed in the catalytic reactor, wherein the catalytic reactor is configured to convert at least one of the plurality of sulfur species to elemental sulfur and an offgas depleted in the sulfur species.

Viewed from another perspective, preferred plants include a direct reduction reactor that is configured such that sulfur oxides and hydrogen sulfide from an oxygen depleted gas are converted to elemental sulfur, wherein a reducing gas generator is coupled upstream of the reduction reactor and configured to operate under conditions sufficient to deplete oxygen from a feed gas comprising the sulfur oxides and the hydrogen sulfide to thereby generate the oxygen depleted gas (and to provide at least a portion of the reducing agent). In such plants, it is generally contemplated that the sulfur oxides and the hydrogen sulfide are present in the oxygen depleted gas at a concentration of equal to or no more than 15 vol %. However, higher concentrations are not expressly excluded (supra). Among other operating conditions, it is preferred that the reducing gas generator is configured to operate at a temperature of between 1000-1500° F., and that the direct reduction reactor is configured to operate at a temperature of between 400-1000° F.

Therefore, a method of treating an acid gas may include a step in which an oxygen-containing acid gas is provided that includes a plurality of sulfur species, and in which at least a portion of the oxygen-containing acid gas is fed to a reducing gas generator. Most preferably, the reducing gas generator is operated under conditions effective to remove oxygen in the oxygen-containing acid gas to thereby form an oxygen depleted gas that is enriched in hydrogen and carbon monoxide. In yet another step, at least one of the hydrogen and the carbon monoxide are reacted in the presence of a direct reduction catalyst with at least one of the sulfur species to thereby form elemental sulfur and an offgas depleted in the sulfur species.

Thus, specific embodiments and applications of improved configurations and methods for $SO_X$ removal in oxygen-containing gases have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
    a source that is configured to provide an oxygen-containing acid gas comprising a plurality of sulfur species;
    a reducing gas generator coupled to the source and configured to receive the oxygen-containing acid gas, and further configured to operate under conditions effective to remove oxygen in the oxygen-containing acid gas and to produce an oxygen depleted gas that is enriched in hydrogen and carbon monoxide;
    a cooler that is configured to reduce a temperature of the oxygen depleted gas to a temperature between 400-600° F. to so form a cooled oxygen depleted gas;
    a catalytic reactor coupled to the reducing gas generator and configured to receive the cooled oxygen depleted gas;
    a direct reduction catalyst disposed in the catalytic reactor, wherein the catalytic reactor is configured to convert at least one of the plurality of sulfur species to elemental sulfur and an offgas depleted in the sulfur species; and
    wherein the reducing gas generator, the direct reduction catalyst, and the catalytic reactor are further configured to prevent reduction of the at least one of the plurality of sulfur species in a Claus reaction.

2. The plant of claim 1 wherein the oxygen-containing acid gas comprises a gas from at least one of a catalyst regenerator effluent, a fluid catalytic cracking flue gas, a coker flue gas, and a smelter flash gas.

3. The plant of claim 1 wherein the oxygen-containing acid gas comprises oxygen in an amount of between 0.001 vol % to 15 vol %.

4. The plant of claim 1 wherein the sulfur species that is present in the oxygen-containing acid gas is selected from the group consisting of sulfur dioxide, sulfur trioxide, carbonyl sulfide, hydrogen sulfide, and carbon disulfide.

5. The plant of claim 1 wherein the sulfur species in the oxygen-containing acid gas is present at a concentration of no more than 50 vol %.

6. The plant of claim 1 wherein the direct reduction catalyst is an optionally doped fluorite-type oxide.

7. The plant of claim 1 further comprising a source of hydrogen configured to provide hydrogen to the reducing gas generator.

8. The plant of claim 1 wherein the oxygen-containing acid gas is at a pressure of no more than 50 psia.

9. The plant of claim 1 wherein the reducing gas generator is operated at a temperature of between 1100-1300° F.

10. A plant comprising:
    a direct reduction reactor comprising a direct reduction catalyst and configured such that sulfur oxides and hydrogen sulfide from an oxygen depleted gas are converted to elemental sulfur; and
    a reducing gas generator coupled upstream to the reduction reactor and configured to operate under conditions sufficient to deplete oxygen from a feed gas comprising the sulfur oxides and the hydrogen sulfide to thereby generate the oxygen depleted gas; and
    wherein the direct reduction reactor, the direct reduction catalyst, and the reducing gas generator are configured to prevent reduction of the sulfur oxides and hydrogen sulfide in a Claus reaction.

11. The plant of claim 10 wherein the sulfur oxides and the hydrogen sulfide are present in the oxygen depleted gas at a concentration of no more than 15 vol %.

12. The plant of claim 10 wherein the reducing gas generator is configured to operate at a temperature of between 1000-1500° F., and wherein the direct reduction reactor is configured to operate at a temperature of between 400-1000° F.

13. The plant of claim 10 further comprising an effluent cooler that is disposed between the reducing gas generator and the direct reduction reactor.

14. The plant of claim 10 wherein the feed gas comprises a gas from at least one of a catalyst regenerator effluent, a fluid catalytic cracking flue gas, a coker flue gas, and a smelter flash gas.

15. A method of treating an acid gas, comprising:
    providing an oxygen-containing acid gas that includes a plurality of sulfur species, and feeding at least a portion of the oxygen-containing acid gas to a reducing gas generator;
    operating the reducing gas generator at a temperature of between about 1000 to about 1600° F. and under conditions effective to remove oxygen in the oxygen-containing acid gas to thereby form an oxygen depleted gas that is enriched in hydrogen and carbon monoxide; and
    reacting at least one of the hydrogen and the carbon monoxide in the presence of a direct reduction catalyst under conditions effective to prevent a Claus reaction with at least one of the plurality of sulfur species to thereby form elemental sulfur and an offgas depleted in the sulfur species.

16. The method of claim 15 wherein the reducing gas generator is operated at a temperature of between 1100-1400° F., and wherein the step of reacting the at least one of the hydrogen and the carbon monoxide in the presence of the direct reduction catalyst is performed at a temperature of between 400-1000° F.

17. The method of claim 15 wherein the oxygen-containing acid gas comprises a gas from at least one of a catalyst regenerator effluent, a fluid catalytic cracking flue gas, and a coker flue gas.

18. The method of claim 15 further comprising a step of providing a hydrogen stream to the oxygen depleted gas.

19. The method of claim 15 wherein the offgas is vented to the atmosphere.

* * * * *